US008068299B2

(12) United States Patent
Tsunokawa et al.

(10) Patent No.: US 8,068,299 B2
(45) Date of Patent: Nov. 29, 2011

(54) DISK DRIVE DEVICE AND DATA REWRITE METHOD THEREOF

(75) Inventors: Toshihiko Tsunokawa, Kanagawa (JP); Nobuhiro Kuwamura, Kanagawa (JP); Masutaka Harada, Kanagawa (JP); Yuhji Yokoe, Kanagawa (JP); Takao Matsui, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 433 days.

(21) Appl. No.: 12/079,496

(22) Filed: Mar. 26, 2008

(65) Prior Publication Data

US 2008/0239901 A1 Oct. 2, 2008

(30) Foreign Application Priority Data

Mar. 26, 2007 (JP) ................. 2007-080273

(51) Int. Cl.
*G11B 5/09* (2006.01)
*G11B 27/36* (2006.01)

(52) U.S. Cl. .................... 360/39; 360/31
(58) Field of Classification Search .......... None
See application file for complete search history.

(56) References Cited

U.S. PATENT DOCUMENTS

| 7,245,447 | B2 * | 7/2007 | Zaitsu ............................ 360/60 |
| 7,463,441 | B2 * | 12/2008 | Cho et al. ........................ 360/60 |
| 2005/0168859 | A1 | 8/2005 | Cho et al. |
| 2005/0180267 | A1 | 8/2005 | Jeong et al. |
| 2006/1023307 | | 10/2006 | Yu |

FOREIGN PATENT DOCUMENTS

| JP | 2001-014606 A | | 1/2001 |
| KR | 20050082090 | * | 8/2005 |
| KR | 1020050082090 A | | 8/2005 |

OTHER PUBLICATIONS

First Office Action Notification from the State Intellectual Property Office of the People's Republic of China for Application No. 2008100836484, dated Nov. 6, 2009, 18 pages total.

* cited by examiner

*Primary Examiner* — Daniell L Negron
*Assistant Examiner* — Regina N Holder

(57) ABSTRACT

Embodiments of the present invention help to reduce the occurrence of read hard errors in a hard disk drive (HDD). According to one embodiment, a HDD rewrites data on all data tracks of a block M when the number of write operations to the block consisting of continuous plural data tracks. The HDD further rewrites data on continuous plural data tracks and adjacent to the block. Since the number of write operations is counted every block, a memory area to register the number of write operations can be reduced.

14 Claims, 8 Drawing Sheets

| HEAD NO. | BLOCK NO. | NUMBER OF WRITE OPERATIONS |
|---|---|---|
| 0 | 0 | $C\_0\_0$ |
| 0 | 1 | $C\_0\_1$ |
| ... | ... | ... |
| 1 | 0 | $C\_1\_0$ |
| 1 | 1 | $C\_1\_1$ |
| ... | ... | ... |

DISK DRIVE DEVICE AND DATA REWRITE METHOD THEREOF

CROSS-REFERENCE TO RELATED APPLICATION

The instant nonprovisional patent application claims priority to Japanese Patent Application No. 2007-080273 filed Mar. 26, 2007 and which is incorporated by reference in its entirety herein for all purposes.

BACKGROUND OF THE INVENTION

Disk drive devices using various kinds of disks, such as an optical disk, a magneto-optical disk, and a flexible magnetic disk, have been known in the art. In particular, a hard disk drive (HDD) has been widely used as a storage device of a computer and has been one of indispensable disk drive devices for current computer systems. Moreover, the HDD has found widespread application such as a removable memory used in a moving image recording/reproducing apparatus, a car navigation system, a cellular phone, or a digital camera, as well as the computer, due to its outstanding characteristics.

A magnetic disk used in the HDD has a plurality of data tracks formed concentrically. Each data track has a plurality of data sectors recorded thereon. Further, a plurality of servo data are recorded discretely in a circumferential direction on the magnetic disk. A head element portion supported by a swinging actuator accesses a desired data sector in accordance with address information of servo data, which allows data write to and data retrieval from a data sector.

The HDD repeats data write and data retrieval operations on a recording surface of the magnetic disk. In writing data to a selected track, leakage fields from a head affect the magnetic data on tracks adjacent to the selected track. Repetitive changes in magnetization on the data track affect magnetization of adjacent tracks. Therefore, if writing data on a certain data track is repeated, interference to the adjacent tracks due to the leakage fields from the head and the changes in magnetization on the data track is repeated so that the user data on the adjacent data tracks may change to cause a read hard error.

In order to prevent such a read hard error, a technique has been proposed that counts the number of write operations to each data track and rewrites data of adjacent data tracks if the number of write operations exceeds a threshold (for example, refer to Japanese Patent Publication No. 2005-216476 "Patent Document 1"). Specifically, the HDD disclosed in Patent Document 1 counts the number of write operations to the adjacent data tracks with respect to each data track. If the number of writing to the adjacent data track exceeds the threshold, the HDD retrieves the data on the particular data track and rewrites the retrieved data onto the same data track.

The above-described conventional technique effectively prevents occurrence of a read hard error due to repetitive data write onto a certain data track. However, as the number of the data tracks of the magnetic disk increases, the memory area required for recording the number of write operations increases. Although the storage capacity of the HDD notably increases, it is required to decrease the memory area for recording the number of write operations. Besides, it is supposed that the influence of data write expands to a wider area than the adjacent data tracks with decrease in track pitch.

BRIEF SUMMARY OF THE INVENTION

Embodiments of the present invention help to reduce the occurrence of read hard errors in an HDD. According to the particular embodiment of FIG. 3, a HDD 1 rewrites data on all data tracks 115 of a block M when the number of write operations to the block M consisting of continuous plural data tracks. The HDD 1 further rewrites data on continuous plural data tracks 116a and 116b adjacent to the block M. Since the number of write operations is counted every block, a memory area to register the number of write operations can be reduced.

BRIEF DESCRIPTION OF THE DRAWINGS

FIG. 7 shows an example of the rewrite management table according to one embodiment.

DETAILED DESCRIPTION OF THE INVENTION

Figure 1:
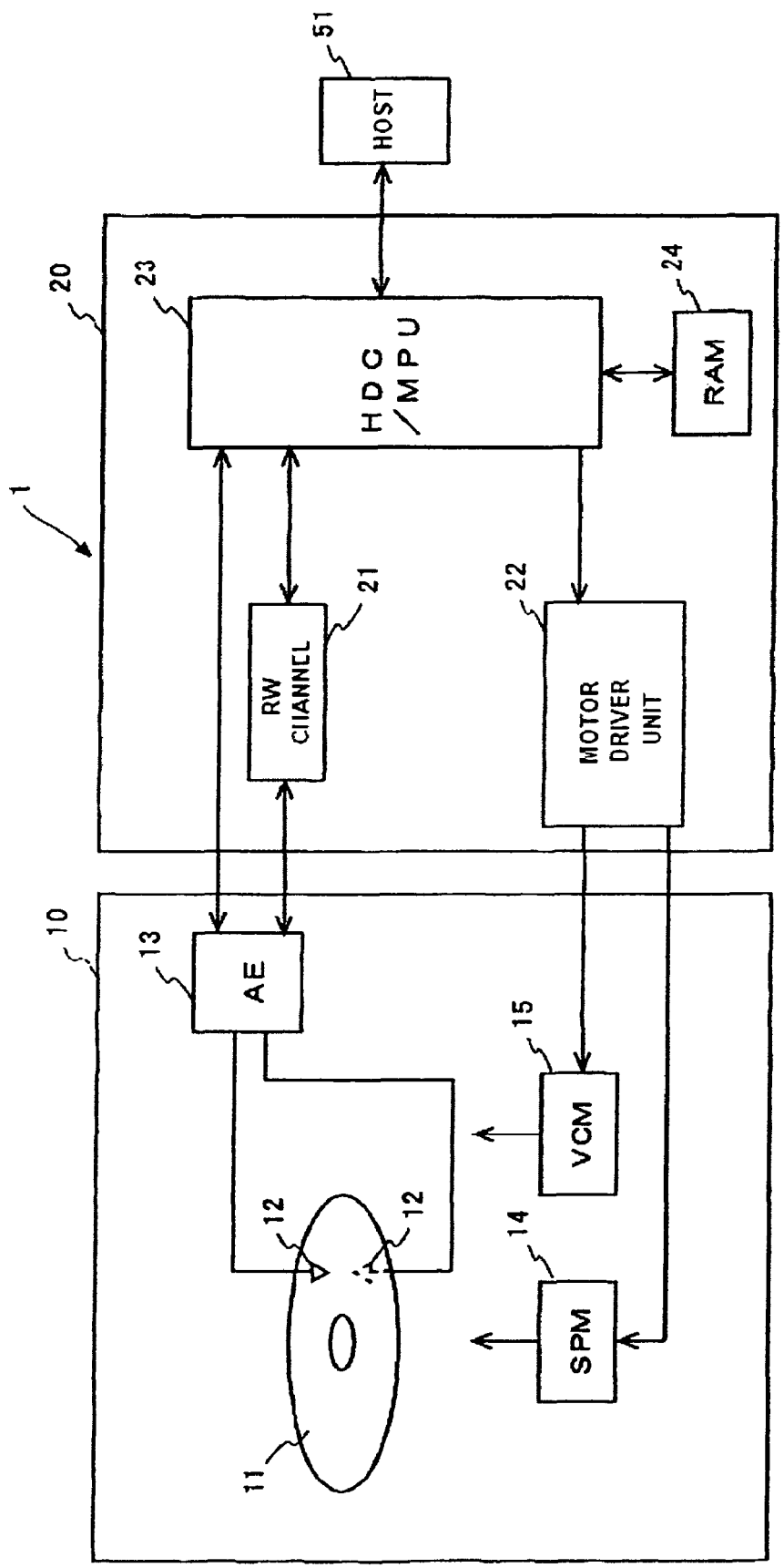
FIG. 1 is a block diagram schematically showing the entire configuration of an HDD according to one embodiment.

Embodiments of the present invention relate to a disk drive device and a data rewrite method thereof, and more particularly, to data protection from influence to adjacent tracks caused by repetition of data write operation.

An aspect of embodiments of the present invention is a data rewrite method on a disk recording surface in a disk drive device. This method counts the number of write operations with respect to a group of tracks consisting of continuous plural tracks on a recording surface of the disk. If the number of write operations exceeds a threshold, the method rewrites data on each track of the group of tracks and data on a track adjacent to the group of tracks. Counting the number of write operations to a group of tracks achieves decrease of the necessary storage area for counting.

The rewriting data may rewrite data on continuous plural tracks adjacent to the group of tracks. This achieves effective decrease of occurrence of read hard errors even in a narrow track pitch.

The rewriting data may rewrite data on each of partial tracks of plural tracks at different operation timings. Moreover, the rewriting data may rewrite data on the partial tracks of the plural tracks at a timing of a data write operation and/or a data retrieval operation to and from a predetermined region corresponding to the track to be rewritten. This achieves prevention of performance degradation.

The counting may count the number of write operations during a seek operation to a track of the group of tracks. This results in no need of additional operation time for counting and achieves to prevent performance degradation.

The rewriting data may refer to the data set registered to be variable and indicating a region which is to be rewritten, and rewrites data on tracks in the number indicated by the data among tracks adjacent to the group of tracks. This achieves proper data protection depending on the design of the disk drive device or operating conditions.

The disk drive device according to another aspect of embodiments of the present invention comprises a controller for counting the number of write operations with respect to a group of tracks consisting of continuous plural tracks on a recording surface of the disk, and a head for rewriting data on each track of the group of tracks and data on a track adjacent to the group of tracks if the number of write operations exceeds a threshold. Counting the number of write operations to a group of tracks achieves decrease of the necessary storage area for counting.

The head may rewrite data on continuous plural tracks adjacent to the group of tracks. This achieves effective decrease of occurrence of read hard errors even in a narrow track pitch.

The head may rewrite data on each of partial tracks of plural tracks at different operation timings. This achieves prevention of performance degradation. Moreover, the head may rewrite data on the partial tracks of the plural tracks at a timing of a data write operation and/or a data retrieval operation to and from a predetermined region corresponding to the track to be rewritten. This achieves to shorten the operation time for rewriting data on a part of the tracks. In one example, the head rewrites data on the partial tracks of the plural tracks at a timing of a data write operation and/or a data retrieval operation to and from the group of tracks.

The controller may count the number of write operations during a seek operation to a track of the group of tracks. This results in no need of additional operation time for counting and achieves to prevent performance degradation.

The controller may refer to a data set registered to be variable and indicating a region which is to be rewritten, and the head rewrites data on tracks in the number indicated by the data among the tracks adjacent to the group of tracks under control of the controller. This achieves proper data protection depending on the design of the disk drive device or operating conditions.

A disk drive device according to yet another aspect of embodiments of the present invention comprises a controller for counting the number of write operations with respect to a group of tracks consisting of a track or continuous plural tracks on a recording surface of the disk, and a head for rewriting data on the track or continuous plural tracks adjacent to the group of tracks if the number of write operations exceeds a threshold. This achieves effective decrease of occurrence of read hard errors even in a narrow track pitch.

Embodiments of the present invention may help to decrease occurrence of read hard errors in the disk drive device.

Hereinafter, certain embodiments to which the present invention has been applied will be described. For clarity of explanation, the following description and the accompanying drawings contain omissions and simplifications as appropriate. Throughout the drawings, like components are denoted by like reference numerals, and their repetitive description is omitted if not necessary. Hereinbelow, embodiments of the present invention will be described by way of example of a hard disk drive (HDD) as an example of a disk drive device. Certain embodiments protect data on a data track from influence by repetitive data write on a different data track.

First, an entire configuration of an HDD is outlined FIG. 1 is a block diagram schematically showing the entire configuration of an HDD 1. The HDD 1 includes a circuit board 20 fixed outside of an enclosure 10. On the circuit board 20, circuits such as a read-write channel (RW channel) 21, a motor driver unit 22, an integrated circuit hard disk (HDC/MPU) 23 of a hard disk controller (HDC) and a multiprocessing unit (MPU), and a RAM 24 are implemented.

In the enclosure 10, a spindle motor (SPM) 14 rotates a magnetic disk 11 at a specific angular rate. The magnetic disk 11 is a disk for storing data. The motor driver unit 22 drives the SPM 14 in accordance with control data from the HDC/MPU 23. Each head slider 12 includes a slider flying over the magnetic disk and a head element portion which is fixed to the slider and converts magnetic signals to and from electric signals (reading and writing data).

Each head slider 12 is fixed to a tip end of an actuator 16. The actuator 16, which is coupled to a voice coil motor (VCM) 15, pivots about a pivotal shaft to move the head slider 12 above the magnetic disk 11 in its radial direction. The motor driver unit 22 drives the VCM 15 in accordance with control data from the HDC/MPU 23. An arm electronics (AE) 13 selects a head slider 12 to access (read from or write to) the magnetic disk 11 from a plurality of head sliders 12 in accordance with control data from the HDC/MPU 23 and amplifies read/write signals.

The RW channel 21 extracts servo data and user data from the read signals obtained from the AE 13 to perform a decoding process. The decoded data are supplied to the HDC/MPU 23. The RW channel 21, in a write operation, code-modulates write data supplied from the HDC/MPU 23 and further converts the code-modulated data into write signals to supply them to the AE 13. In the HDC/MPU 23, an HDC is a logic circuit and an MPU operates in accordance with firmware loaded in the RAM 24. Starting up of the HDD 1, data required for control and data processing are loaded from the magnetic disk 11 or a ROM (not shown). The HDC/MPU 23 is an example of a controller and performs entire control of the HDD 1 in addition to necessary processes such as head positioning control, interface control, defect management, and the like.

The HDC/MPU 23 transmits read data from the magnetic disk 11 obtained through the RW channel 21 to a host 51. The read data from the magnetic disk 11 is temporarily stored in a read buffer in the RAM 24 before transmitted to the host 51 via the HDC/MPU 23. Write data from the host 51 are temporarily stored in a write buffer in the RAM 24 via the HDC/MPU 23, and then are transmitted to the magnetic disk 11 via the HDC/MPU 23 at a specific timing. The HDC/MPU 23 according to the present embodiment particularly controls data rewrite corresponding to the number of data write operations.

Figure 2:
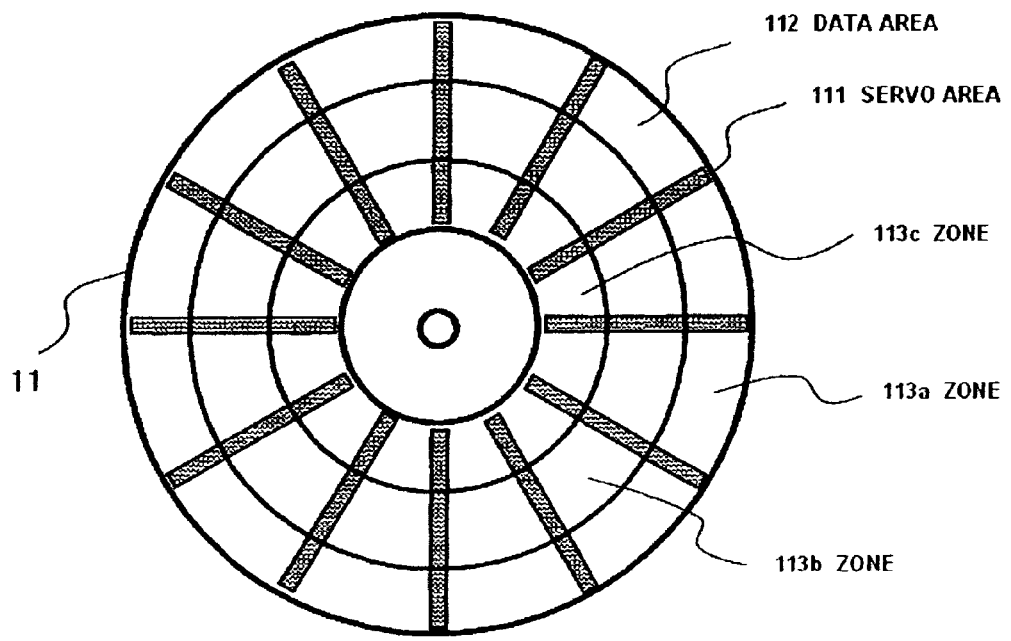
FIG. 2 is a view schematically showing servo data and user data on a magnetic disk according to one embodiment.

FIG. 2 schematically shows recorded data on the magnetic disk 11. As shown in FIG. 2, on the recording surface of the magnetic disk 11, a plurality of servo areas 111 extending radially in the radial direction from the center of the magnetic disk 11 at every specific angle and data areas 112 between the adjoining two servo areas 111 are formed. The servo areas 111 and data areas 112 are provided alternately at a specific angle. In each servo area 111, servo data for controlling positioning of the head slider 12 are recorded. In each data area 112, user data are recorded. The user data and the servo data are recorded on concentric data tracks and servo tracks, respectively. Data tracks are divided into a plurality of groups of zones in accordance with radial position on the magnetic disk 11. A recording frequency is set to each zone. In FIG. 2, three zones 113a to 113c are exemplified.

Hereinbelow, monitoring the number of data write operations and data rewrite operations corresponding to the number of data write operations according to the present embodiment will be described in detail. The HDC/MPU 23 counts the number of write operations for each of continuous, namely adjacent plural data tracks. In the present specification, a group of the continuous plural data tracks is referred to as a block. The HDC/MPU 23 rewrites each data track of the block and data tracks adjacent to the block if the number of write operations to one block exceeds a reference number. The HDC/MPU 23 typically rewrites all of the data sectors on the data track.

Figure 3:
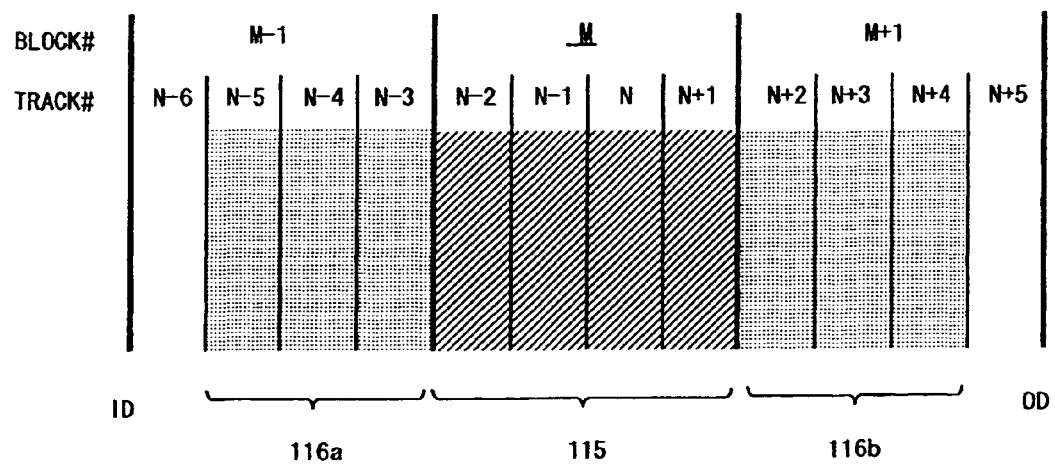
FIG. 3 is a view showing data tracks to which the number of write operations is counted and data tracks to be rewritten according to one embodiment.

Now referring to FIG. 3, an example of the data rewrite operation according to the present embodiment will be described. FIG. 3 illustrates continuous 12 data tracks on one recording surface. Each one of the track numbers (TRACK #) from N−6 to N+5 is assigned to each of the data tracks, respectively. In the example of FIG. 3, four continuous data tracks constitute one block. FIG. 3 illustrates three blocks and each of the block numbers (BLOCK #), M−1, M, and M+1, is assigned to each of the blocks, respectively.

When the number of write operations to the block M exceeds the reference number, the HDC/MPU 23 rewrites data on all of the data tracks 115 of the block M. Further, the HDC/MPU 23 rewrites data on continuous plural data tracks 116a and 116b adjoining the block M. In the example of FIG. 3, the number of data tracks to be rewritten on the inner diameter side and the outer diameter side is respectively three.

Since the HDC/MPU 23 counts the number of write operations every block, memory area for registering the number of write operations can be reduced. In the example of FIG. 3, one block consists of four data tracks so that the required memory area will be one fourth comparing to the case of monitoring the number of write operations every data track.

The HDC/MPU 23 rewrites the continuous plural data tracks 116a and 116b adjacent to the data block M in addition to each of the data tracks of the block M to which the number of write operations exceeds the reference number. Thereby, for example, even if a data write operation to the innermost data track N−2 or the outermost data track N+1 in the block M is frequently made, data on the data tracks outside of the block M can be protected.

As the track pitch decreases, influence of data write operation to one data track may reach a distant data track in addition to an adjoining data track. Therefore, rewriting the continuous plural tracks 116a and 116b adjacent to the block M as shown in FIG. 3 achieves effective prevention of data corruption caused by repetitive data write operation even in a high-density recording HDD.

Figure 4A:
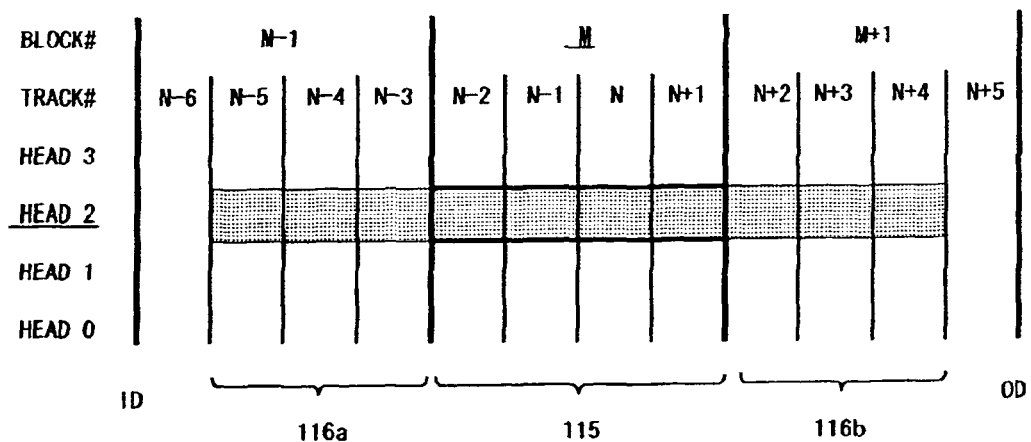
FIGS. 4(a) and 4(b) are views showing other examples of data tracks to which the number of write operations is counted and data tracks to be rewritten according to one embodiment.

As described above, it is important to count the number of write operations and data rewrite operations on a data track on one recording surface because there exists no magnetic interference among data tracks on different recording surfaces. FIG. 4(a) schematically illustrates an example to perform the operation of FIG. 3 with a third head slider HEAD 2 in an HDD equipped with four heads (two magnetic disks). One head slider is assigned to one recording surface.

Figure 4B:
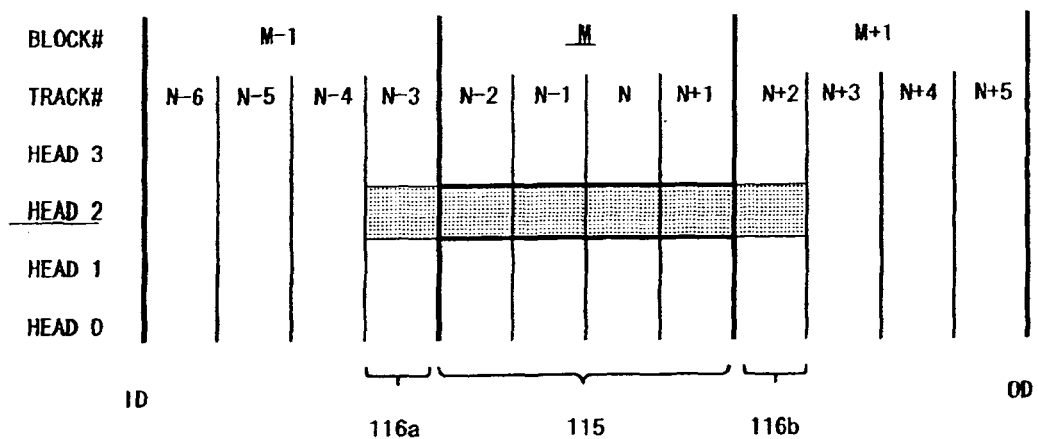

If the track pitch of the magnetic disk 11 is small, it is preferable that the continuous plural data tracks adjacent to the particular block are rewritten as described above. However, if the influence of the data write operation is limited to one adjacent data track, the HDD 1 may rewrite only the adjacent data track N−3 in the inner diameter side than the block M and only the adjacent track N+2 in the outer diameter side than the block M, respectively, as shown in FIG. 4(b).

Figure 5A:
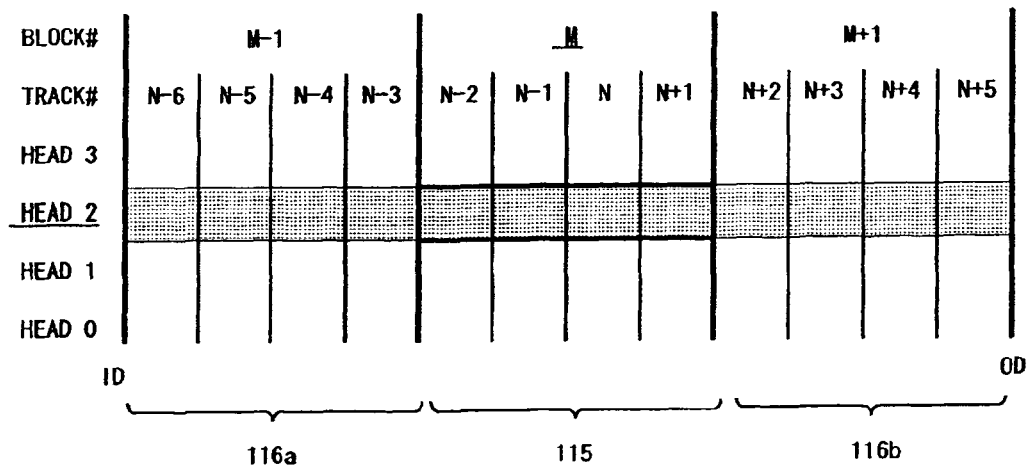
FIGS. 5(a) and 5(b) are views showing other examples of data tracks to which the number of write operations is counted and data tracks to be rewritten according to one embodiment.
Figure 5B:
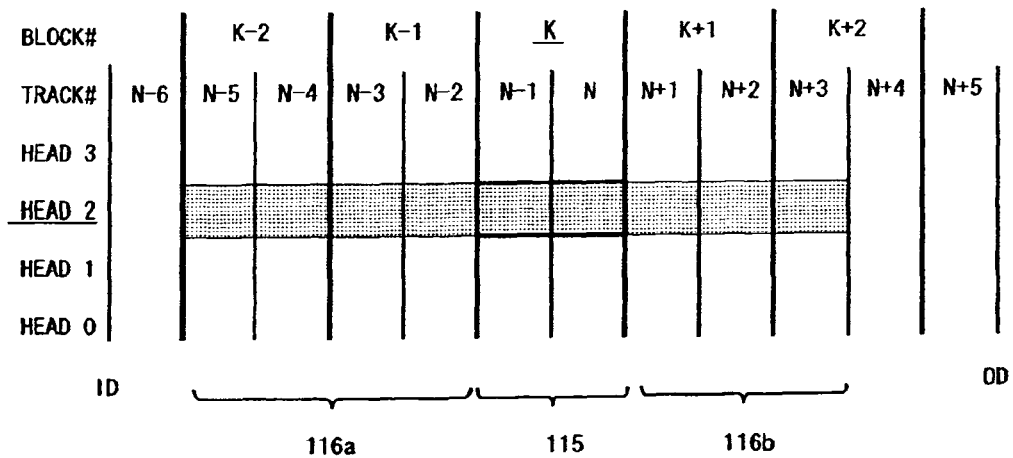

The number of data tracks constituting a block and the number of data tracks to be rewritten outside of the block are respectively decided depending on the design of the HDD 1. FIGS. 5(a) and 5(b) illustrates other examples of the number of data tracks constituting a block to be a unit for counting the number of data write operations and the number of data tracks to be rewritten. In the example of FIG. 4(a), the number of continuous tracks adjacent to the block to be rewritten is smaller than the number of tracks constituting a block. On the contrary, as shown in FIG. 5(a), the number of continuous tracks adjacent to the block to be rewritten is the same as the number of tracks constituting a block. In FIG. 5(a), the number of tracks constituting a block and the number of continuous data tracks to be rewritten are respectively four.

Or, as shown in FIG. 5(b), the number of tracks constituting a block may be smaller than the number of continuous data tracks to be rewritten outside of the block. Or again, as shown in FIG. 5(b), the number of data tracks to be rewritten on the inner diameter side and the number of data tracks to be rewritten on the outer diameter side may be different. In FIG. 5(b), the number of tracks constituting a block is two and the numbers of continuous data tracks to be rewritten is four on the inner diameter side and three on the outer diameter side.

The number of data tracks constituting a block may be different depending on the recording surface or the number of data tracks constituting a block may be different depending on the position on the recording surface. If the block is located on the innermost diameter or the outermost diameter of the recording surface, the data tracks adjacent to the block is on either of the outer diameter side and the inner diameter side.

As described above, it may be desirable to count the number of write operations every block and rewrite the continuous plural data tracks adjacent to the block. However, it may be possible to count the number of write operations every data track and rewrite the continuous plural data tracks adjacent to the data track. This increases the necessary memory area but can protect the data on the magnetic disk more reliably from the influence caused by a data write operation.

Figure 6:
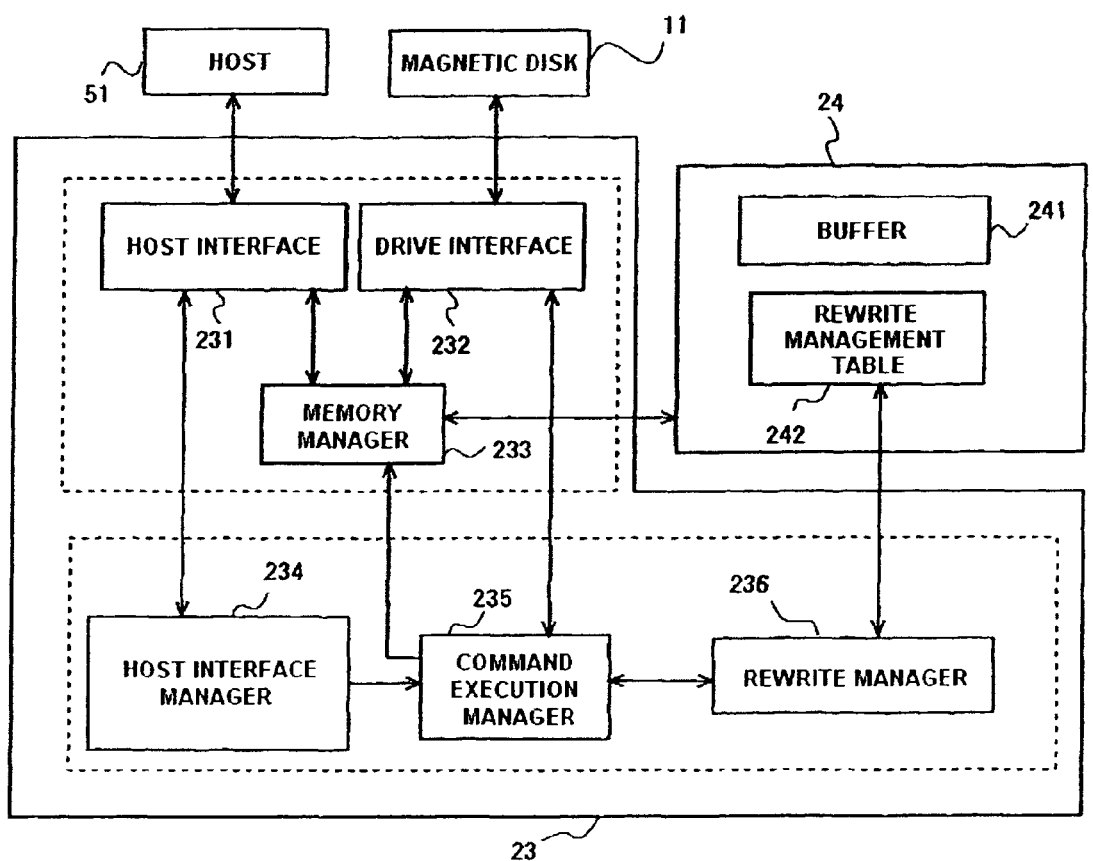
FIG. 6 is a block diagram schematically showing logic components relating to monitoring of the number of write operations and rewrite operations in the HDD according to one embodiment.

Next, specific processes of monitoring the number of write operations and the rewrite operations in the HDD 1 according to embodiments of the present invention will be described. FIG. 6 is a block diagram schematically showing logic components within the HDD 1 relating to these operations. FIG. 7 shows an example of a rewrite management table 242 for storing data to determine the data tracks to be rewritten. The rewrite management table 242 is provided in the RAM 24. The HDC/MPU 23 controls the rewrite operation.

The HDC/MPU 23 comprises a host interface 231, a drive interface 232, and a memory manager 233 as hardware components. The MPU working on firmware functions as a host interface manger 234, a command execution manger 235, and the rewrite manger 236. The memory RAM 24 temporarily stores commands and data and has a buffer 241 for temporarily storing the data in addition to the rewrite management table 242.

The host interface 231 performs actual data transmission to and from the host 51. The drive interface 232 executes actual data input/output from and to the magnetic disk 11 (or the RW channel 21). The memory manager 233 controls data storage of the RAM (memory) 24 to transfer various data between other function blocks in the HDC/MPU 23 and the RAM 24. The host interface manager 234 manages the host interface 231 to give and receive specific notifications or instructions to and from the host interface 231.

The rewrite manager 236 controls data rewrite operations based on the number of write operations. The rewrite manager 236 registers the number of write operations in the rewrite management table 242 and executes a data rewrite operation to the magnetic disk 11 referring to the rewrite management table 242. The command execution manager 235 controls command executions. The command execution manager 235 controls the drive interface 232 to control data write operations and data retrieval operations to and from the magnetic disk 11.

Figure 8:
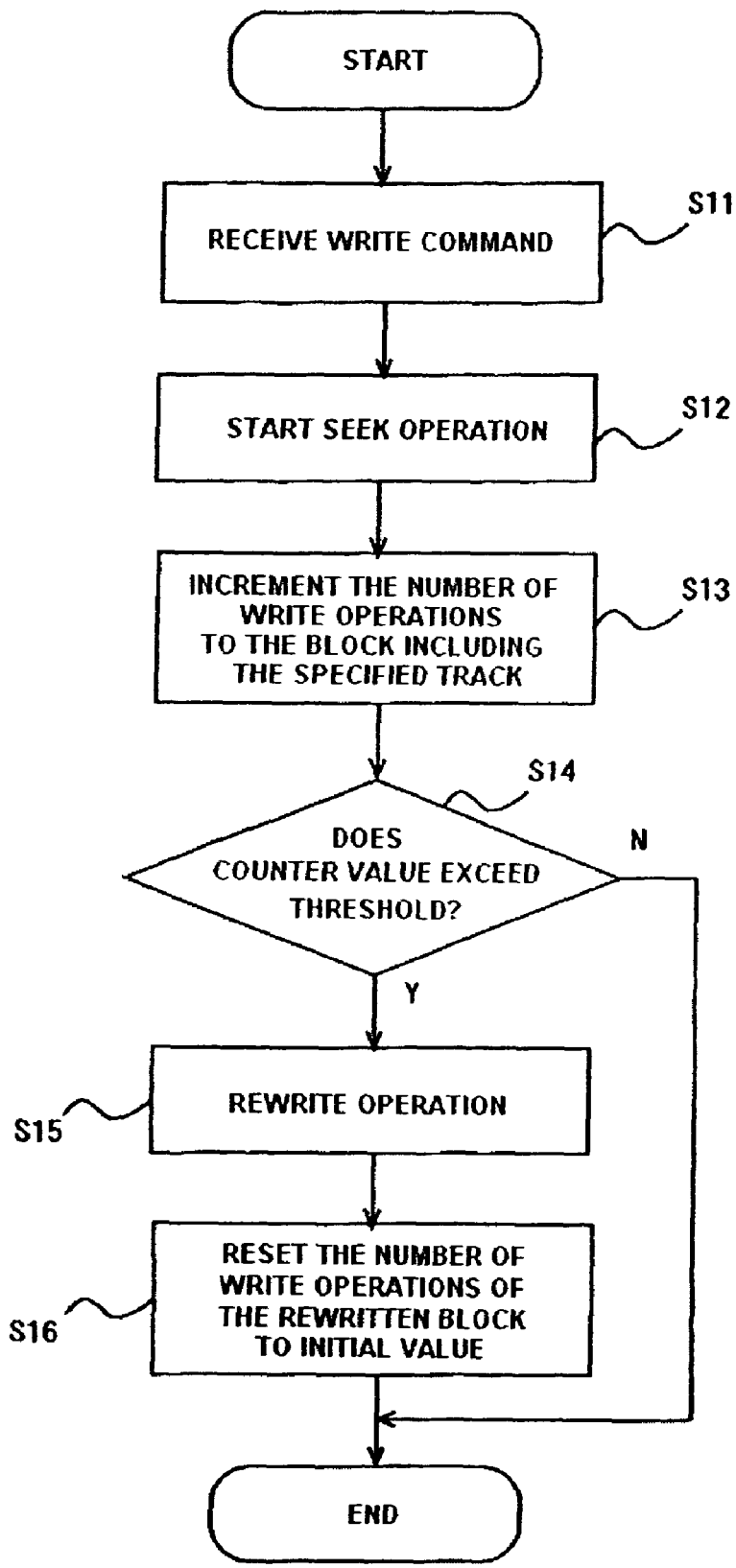
FIG. 8 is a flowchart showing operational steps for counting the number of write operations and rewriting according to one embodiment.

Next, operational steps for counting the number of write operations and rewriting will be described referring to the block diagram of FIG. 6 and a flowchart of FIG. 8. When the host interface 231 receives a write command from the host 51 (S11), it transfers the command to the command execution manager 235 via the host interface manager 234. Further, the host interface 231 receives write data from the host 51. The write data are stored in the buffer 241 via the memory manager 233.

The command execution manager 235 instructs the memory manager 233 and the drive interface 232 to transfer the write data to the magnetic disk 11 (the RW channel 21). The drive interface 232 controls a seek operation to a target track and a following operation, and a data write operation to a target sector (S12) according to instructions from the command execution manager 235.

The command execution manager 235 instructs a data write to the magnetic disk 11 as described above, and then transfers the write command to the rewrite manager 236. The rewrite manager 236 refers to an address specified by the write command and updates the rewrite management table 242. Specifically, the rewrite manager 236 increments the counter for the number of write operations to the block including the data track at the address indicated by the write data (S13). The rewrite manager 236 updates the rewrite management table 242 during the seek operation, which does not require additional operation time for updating and avoids performance degradation.

In addition, the rewrite manager 236 determines whether or not the incremented number of write operations onto the block exceeds a reference number (S14). If the number of write operations has not exceeded the reference number (N in S14), the rewrite manager 236 will not execute the rewrite operation. If the number of write operations has exceeded the reference number (Y in S14), the rewrite manager 236 executes the rewrite operation (S15).

The rewrite manager 236 specifies the address to the command execution manager 235 and instructs it to rewrite the data. The command execution manager 235 instructs the memory manager 233 and the drive interface 232 to execute a data rewrite at the specified address. The rewrite retrieves the data from the specified address of the magnetic disk 11 and writes the retrieved data at the same address.

After the rewrite operation has ended, the command execution manager 235 notifies the rewrite manager 236 of it. The rewrite manager 236 updates the rewrite management table 242 in accordance with the notification. Specifically, the rewrite manager 236 resets the number of write operations of the head number and the block number where the rewrite operation has ended to the initial value (S16).

There are some ways to count the number of write operations to a block consisting of continuous plural data tracks. One example counts the number of write operations every seek under one command. That is, if a seek operation to a target track is performed for a data write operation, the rewrite manager 236 increments the number of write operations to the target track. The number of write operations is incremented by one regardless of the number of data sectors to be written.

If another seek operation to another target track is performed in a data write operation to the address specified by one write command, the rewrite manager 236 increments the number of write operations to the block where the another target data track is included. If the address specified by one write command contains a plurality of data tracks in one block, one way is that the number of write operations to the block is assigned to be one. The number of write operations to each block increases by one every write command including the block.

Figure 9:
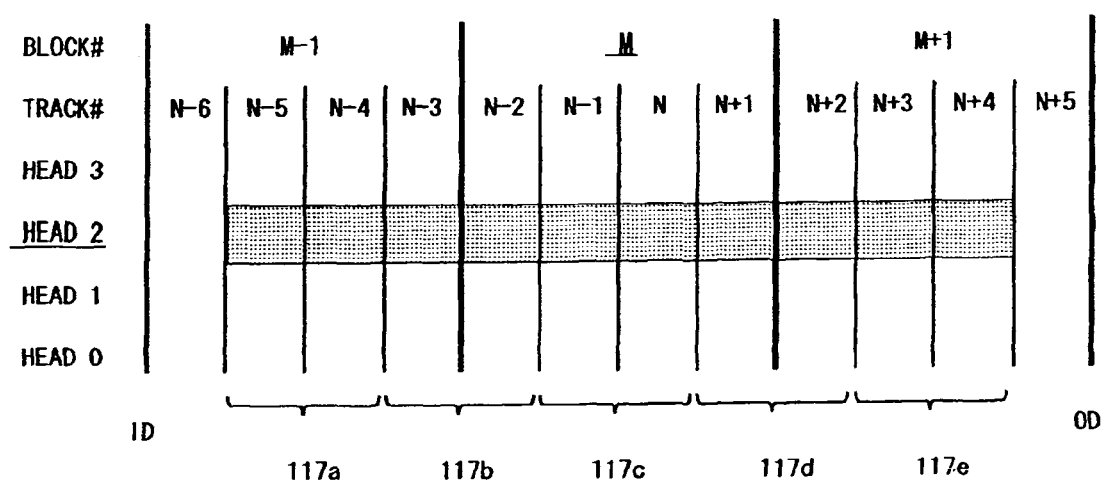
FIG. 9 is a view showing an example which divides a data track to be rewritten to plural sub-sections and rewrites every sub-section.

The user data rewrite operation (S15) preferably divides plural data tracks to be rewritten into plural sub-sections and rewrites each of the sub-sections at a different timing. FIG. 9 is an example that divides ten data tracks to be rewritten into five sub-sections 117a to 117e by every two data tracks. The rewrite manager 236 rewrites each of the sub-sections 117a to 117e at a different timing.

In one example, the rewrite manager 236 rewrites each of the sub-sections 117a to 117e in data write operations and/or data retrieve operations to and from the block M which is the reference for counting the number of write operations. For example, the rewrite manager 236 executes the rewrite operation to the sub-section 117a at the timing of the write operation by which the number of write operations has just exceeded the reference number. The rewrite manager 236 executes the rewrite operation to the sub-section 117b at the timing of the next write operation to the block M. The rewrite manager 236 executes the rewrite operation to the sub-section 117c at the timing of another next write operation to the block M.

In this way, the rewrite manager 236 sequentially rewrites to each of the sub-blocks 117a to 117e at the timing of the write operations to the block M. The rewrite operations can be performed every data write operation to the block M, every data retrieval operation, or the both of the data retrieval and writing operations. In case that rewrite operations to all of the data tracks are performed at one operation timing, it may take much time to perform the operations and lead to performance degradation.

The performance degradation can be avoided by dividing the data tracks to be rewritten and rewriting to every part of the data tracks over a plurality of operation timings as described above. Since the data track to be rewritten is present close to the block M, the operation time for the rewrites can be shortened.

For easiness of control and effectiveness in performance maintenance, it is preferable to rewrite each of the sub-sections at every access operation to the block M which is the reference for counting the number of write operations as described in the above example, but other ways may be proposed. For example, one sub-section may be rewritten at a timing of access operation (write or retrieve operation) to a block including an area to be rewritten, that is, any one of the blocks M−1, M, and M+1 in the example of FIG. 8. Or, if the order of the sub-sections to be rewritten has been determined, a sub-section may be rewritten at a timing of access operation to the block including the sub-section.

As in the above examples, in write and/or retrieve operations to/from predetermined area from/to the data tracks 115, 116a, and 116b to be rewritten, rewrite to each of the sub-sections achieves to rewrite each of the sub-sections in an access operation (write or retrieve operation) to a vicinity of the sub-sections to be rewritten and to shorten the operation time.

In an HDD 1 in which the performance degradation does not become a problem, all of the data tracks may be rewritten. For example, if the number of write operations to a subject block exceeds the reference number, all of the data tracks may be rewritten in the data write operation at that time. The number of data tracks constituting a sub-section may be a single or plural, and the number of data tracks in each sub-section may be the same or different values.

The number of data tracks to be rewritten is preferably variable and can be set. Specifically, in the example of FIG. 4, the numbers of data tracks of a group of data tracks 116a and a group of data tracks 116b may be able to be set individually. The region where the influence of the data write operation reaches may change depending on the design or conditions of the HDD. Therefore, setting the region to be rewritten to a preferable value can achieve data protection and excellent performance.

The number of data tracks is determined for the inner and outer diameter sides integrally or can be determined individually. The rewrite manger 236 refers to the preset data and rewrites the data track whose number the data indicates. The data can be set in the manufacture of the HDD 1 or by the HDC/MPU 23 according to the predetermined conditions.

As set forth above, the present invention is described by way of the particular embodiments but is not limited to the above embodiments. A person skilled in the art can easily modify, add, and convert the each element in the above embodiments within the scope of the present invention. For example, the control of the embodiments can be applied to a disk drive device utilizing a disk other than the magnetic disk.

What is claimed is:

1. A data rewrite method on a disk recording surface in a disk drive device, the method comprising:
    counting the number of write operations with respect to a group of tracks consisting of continuous plural tracks on a recording surface of the disk;
    rewriting data on each track of the group of tracks and data on a track adjacent to the group of tracks if the number of write operations exceeds a threshold, wherein the rewriting data rewrites data on each of partial tracks of plural tracks at different operation timings; and
    resetting the number of write operations with respect to said group of tracks to an initial value after said rewriting without maintaining a rewrite count related to the rewriting of said data.

2. The method according to claim 1, wherein the rewriting data rewrites data on continuous plural tracks adjacent to the group of tracks.

3. The method according to claim 1, wherein the rewriting data rewrites data on the partial tracks of the plural tracks at a timing of a data write operation and/or a data retrieval operation to and from a predetermined region corresponding to the track to be rewritten.

4. The method according to claim 1, wherein the counting counts the number of write operations during a seek operation to a track of the group of tracks.

5. The method according to claim 1, wherein the rewriting data utilizes a variable data set to indicate a region which is to be rewritten, and
    rewrites data on tracks in the number indicated by the data among tracks adjacent to the group of tracks.

6. A disk drive device comprising:
    a controller configured to count a number of write operations with respect to a group of tracks consisting of continuous plural tracks on a recording surface of the disk, wherein the controller refers to a data set registered to be variable and to indicate a region which is to be rewritten;
    a head for rewriting data on each track of the group of tracks and data on a track adjacent to the group of tracks if the number of write operations exceeds a threshold, wherein the head rewrites data on tracks in the number indicated by the data among tracks adjacent to the group of tracks under control of the controller; and
    said controller configured to reset the number of write operations with respect to said group of tracks to an initial value after said rewriting without recording the rewriting of said data.

7. A disk drive device according to claim 6, wherein the head rewrites data on continuous plural tracks adjacent to the group of tracks.

8. The disk drive device according to claim 6, wherein the head rewrites data on each of partial tracks of plural tracks at different operation timings.

9. The disk drive device according to claim 8, wherein the head rewrites data on the partial tracks of the plural tracks at a timing of a data write operation and/or a data retrieval operation to and from a predetermined region corresponding to the track to be rewritten.

10. The disk drive device according to claim 9, wherein the rewriting data rewrites data on the partial tracks of the plural tracks at a timing of a data write operation and/or a data retrieval operation to and from the group of tracks.

11. The disk drive device according to claim 6, wherein the controller counts the number of write operations during a seek operation to a track of the group of tracks.

12. A disk drive device comprising:
    a controller configured to count a number of write operations with respect to a group of tracks consisting of a track or continuous plural tracks on a recording surface of the disk;
    a head for rewriting data on the track or continuous plural tracks adjacent to the group of tracks if the number of write operations exceeds a threshold, wherein the head rewrites data on each of partial tracks of plural tracks at different operation timings in the data rewrite operation; and
    said controller configured to reset the number of write operations with respect to said group of tracks to an initial value after said rewriting without maintaining a rewrite count related to the rewriting of said data.

13. The disk drive device according to claim 12, wherein the data rewrite operation rewrites data on the partial tracks of the plural tracks at a timing of a data write operation and/or a data retrieval operation to and from a predetermined region corresponding to the track to be rewritten.

14. The disk drive device according to claim 12, wherein the controller utilizes variable setting data to indicate a region to be rewritten; and
    the head rewrites data on tracks adjacent to the group of tracks and in the number indicated by the setting data under control of the controller.

* * * * *

UNITED STATES PATENT AND TRADEMARK OFFICE
CERTIFICATE OF CORRECTION

Page 1 of 1

PATENT NO. : 8,068,299 B2
APPLICATION NO. : 12/079496
DATED : November 29, 2011
INVENTOR(S) : Nobuhiro Kuwamura et al.

It is certified that error appears in the above-identified patent and that said Letters Patent is hereby corrected as shown below:

Title page, Item (56)
References Cited: Delete "2006/1023307"

and insert -- 2006/0233077 --

Signed and Sealed this
Twenty-first Day of February, 2012

David J. Kappos
*Director of the United States Patent and Trademark Office*